United States Patent
Matsumoto et al.

(10) Patent No.: US 9,488,395 B2
(45) Date of Patent: Nov. 8, 2016

(54) HEAT EXCHANGER AND HEAT PUMP SYSTEM USING THE SAME

(75) Inventors: Yuuichi Matsumoto, Isesaki (JP); Yusuke Iino, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 262 days.

(21) Appl. No.: 14/342,301

(22) PCT Filed: Aug. 29, 2012

(86) PCT No.: PCT/JP2012/071851
§ 371 (c)(1),
(2), (4) Date: Feb. 28, 2014

(87) PCT Pub. No.: WO2013/031837
PCT Pub. Date: Mar. 7, 2013

(65) Prior Publication Data
US 2014/0202194 A1  Jul. 24, 2014

(30) Foreign Application Priority Data

Sep. 2, 2011  (JP) .................................. 2011-191675

(51) Int. Cl.
| | |
|---|---|
| *F25B 13/00* | (2006.01) |
| *F25B 39/04* | (2006.01) |
| *F25B 40/02* | (2006.01) |
| *B60H 1/32* | (2006.01) |
| *F25B 30/00* | (2006.01) |
| *F28D 1/04* | (2006.01) |
| *F28D 1/053* | (2006.01) |

(52) U.S. Cl.
CPC ............. *F25B 39/04* (2013.01); *B60H 1/3227* (2013.01); *F25B 30/00* (2013.01); *F25B 40/02* (2013.01); *F25B 2339/0444* (2013.01); *F28D 1/0417* (2013.01); *F28D 1/05316* (2013.01)

(58) Field of Classification Search
CPC ........ F25B 39/04; F25B 30/00; F28F 9/0246
USPC .................. 62/324.6, 506; 165/151, 181, 76, 165/104.21, 140
See application file for complete search history.

(56) References Cited

U.S. PATENT DOCUMENTS

2003/0213583 A1* 11/2003 Kamishima ............. F25B 39/04
165/82

FOREIGN PATENT DOCUMENTS

| JP | 38-14439 | 2/1963 |
|---|---|---|
| JP | 6-323674 | 11/1994 |
| JP | 11-211276 | 6/1999 |
| JP | H11211276 | 8/1999 |

(Continued)

*Primary Examiner* — Melvin Jones
(74) *Attorney, Agent, or Firm* — Cozen O'Connor

(57) ABSTRACT

A heat exchanger includes a main core portion (6) for conducting heat exchange between an air and a refrigerant, a receiver tank (8) into which the refrigerant having passed through the main core portion flows, and a subcool core portion (10) for supercooling and liquefying a gas-liquid mixed refrigerant having passed through the receiver tank by heat exchange with the air, wherein the subcool core portion is composed of a plurality of tubes (22) arranged along a crosswise direction between left and right header tanks (20) arranged along the crosswise direction, respectively, in a state in parallel with each other and communicating with both the left and right header tanks; and fins (24) arranged between the adjacent tubes.

6 Claims, 2 Drawing Sheets

(56) References Cited

FOREIGN PATENT DOCUMENTS

| JP | 2001-248933 | 9/2001 |
| JP | 2004-361019 | 12/2004 |
| JP | 2007-187355 | 7/2007 |
| JP | 2009-236404 | 10/2009 |
| WO | WO2011/087001 | 7/2011 |

* cited by examiner

HEAT EXCHANGER AND HEAT PUMP SYSTEM USING THE SAME

RELATED APPLICATIONS

This is a U.S. National Phase Application under 35 USC 371 of International Application PCT/JP2012/071851 filed on Aug. 29, 2012.

This application claims the priority of Japanese application no. 2011-191675 filed Sep. 2, 2011, the entire content of which is hereby incorporated by reference.

TECHNICAL FIELD

The present invention relates to a heat exchanger and a heat pump system using the same and relates to a heat exchanger having functions of both a condenser and an evaporator, for example, and used as an exterior heat exchanger provided outside a heating ventilation and air conditioning (HVAC) unit of a vehicle air-conditioning heat pump system and a heat pump system using the same.

BACKGROUND ART

As this type of heat exchanger, a subcool condenser provided with a condenser core portion for condensing a refrigerant by heat exchange with air, a receiver tank into which the refrigerant having passed through the receiver tank flows from the condenser core portion, and a subcool core portion for supercooling and liquefying a gas-liquid mixed refrigerant having passed through the receiver tank by heat exchange with the air are disclosed (see Patent Literature 1, for example).

The aforementioned condenser core portion and the subcool core portion are composed of a plurality of tubes arranged along a crosswise direction between left and right header tanks arranged along the crosswise direction, respectively, in a state parallel with each other and communicating with both the left and right header tanks; and fins arranged between adjacent tubes.

PATENT LITERATURE

Patent Literature 1: Japanese Patent No. 4052706

SUMMARY OF INVENTION

Technical Problem

At condensation of the refrigerant, density change rates of a liquid refrigerant and a refrigerant gas in the gas-liquid mixed refrigerant remarkably change with a state change of the refrigerant. In this state, since the liquid refrigerant can be influenced by a gravitational force more easily than the refrigerant gas, gas bubbles are generated in the liquid refrigerant flowing through the tube, and a drift might occur in the refrigerant flow. Particularly, if the refrigerant flows in a vertical flow direction, the liquid refrigerant can be easily influenced by a gravitational force, and a drift of the refrigerant can easily occur in the tube. Therefore, if the subcool core portion through which the gas-liquid mixed refrigerant flows is constituted as a vertical refrigerant flow as in the aforementioned prior art, heat exchange does not progress smoothly in the core portion, and there is a concern that heat exchange efficiency of the heat exchanger lowers.

Moreover, the heat exchanger of the aforementioned prior art is a condenser after all, and a heat exchanger having the both functions of the condenser and the evaporator is not assumed, and an exterior heat exchanger to be provided outside the HVAC unit of a vehicle air-conditioning heat pump system is not assumed, either.

The present invention was made in view of the aforementioned circumstances and has an object to provide a heat exchanger whose heat exchange efficiency is drastically improved and which has both functions of a condenser and an evaporator and is suitable for an exterior heat exchanger provided outside the HVAC unit of the vehicle air-conditioning heat pump system and a heat pump system using the same.

Solution to Problem

In order to achieve the aforementioned object, a heat exchanger of the present invention is provided with a main core portion for conducting heat exchange between air and a refrigerant, a receiver tank into which the refrigerant having passed through the main core portion flows, and a subcool core portion for supercooling and liquefying a gas-liquid mixed refrigerant having passed through the receiver tank by heat exchange with the air, in which the subcool core portion is composed of a plurality of tubes arranged along a crosswise direction between left and right header tanks arranged along the crosswise direction, respectively, in a state in parallel with each other and communicating with both the left and right header tanks; and fins arranged between the adjacent tubes.

Preferably, the main core portion is composed of a plurality of tubes arranged along a vertical direction between upper and lower header tanks arranged along the vertical direction, respectively, in a state in parallel with each other and communicating with both the upper and lower header tanks; and fins arranged between the adjacent tubes.

A heat pump system of the present invention is a heat pump system used by switching the heat exchanger to a condenser or an evaporator by changing a flow direction of a refrigerant in the main core portion provided with bypass means for having the refrigerant having passed through the main core portion flow while bypassing the receiver tank and the subcool core portion when the heat exchanger is used as the evaporator.

Preferably, the heat exchanger is provided with a communication portion for having the main core portion and the receiver tank communicate with each other when the heat exchanger is used as a condenser, and the bypass means has a refrigerant channel made to communicate with the communication portion after the refrigerant having passed through the main core portion is made to flow while bypassing the receiver tank and the subcool core portion when the heat exchanger is used as an evaporator and a valve provided on an inlet side of the main core portion of the refrigerant channel and preventing a refrigerant flow to a refrigerant channel side from the communication portion when the heat exchanger is used as the condenser.

On the other hand, the heat pump system of the present invention is a heat pump system used by switching the heat exchanger to a condenser or an evaporator without changing the refrigerant flow direction in the main core portion and is provided with bypass means for having the refrigerant having passed through the main core portion flow while bypassing the receiver tank and the subcool core portion when the heat exchanger is used as the evaporator.

Preferably, the heat exchanger is provided with a communication portion for having the main core portion and the receiver tank communicate with each other when the heat exchanger is used as the condenser, and the bypass means has a refrigerant channel made to communicate with the communication portion after the refrigerant having passed through the main core portion is made to flow while bypassing the receiver tank and the subcool core portion when the heat exchanger is used as the evaporator and a valve provided on an outlet side of the main core portion of the refrigerant channel and preventing a refrigerant flow to a refrigerant channel side from the communication portion when the heat exchanger is used as the condenser.

Preferably, the heat exchanger is used as an exterior heat exchanger provided outside an HVAC unit for vehicle air-conditioning.

Advantageous Effects of Invention

According to the heat exchanger of the present invention, the gas-liquid mixed refrigerant flowing through the subcool core portion can be made a refrigerant flow in the crosswise flow direction. When the refrigerant is condensed, density change rates of the liquid refrigerant and the refrigerant gas in the gas-liquid mixed refrigerant remarkably change with the change in the refrigerant state. In this state, since the liquid refrigerant can be influenced by a gravitational force more easily than the refrigerant gas, gas bubbles might be generated in the liquid refrigerant flowing through the vertically arranged tubes, and a drift might occur in the refrigerant flow. However, by constituting the refrigerant flowing through the subcool core portion in the crosswise flow direction, the liquid refrigerant is less subjected to influence of the gravitational force than the case of the vertical flow direction, and thus, a drift of the refrigerant in the tube can be effectively suppressed. Therefore, heat exchange between the air and the refrigerant in the subcool core portion can be continued for a long time, and lowering of heat exchange efficiency of the heat exchanger can be suppressed.

Moreover, according to the present invention, the refrigerant flowing through the main core portion can be constituted as a refrigerant flow in the vertical flow direction. In evaporation of the refrigerant, condensed water is generated on each of surfaces of the tubes, water is retained on the surfaces of the tubes, which might cause a frosting phenomenon in many cases, and heat exchange efficiency might be lowered by growth of this frost layer. However, by constituting the refrigerant flowing through the main core portion in a vertical flow direction, occurrence of the frosting phenomenon can be suppressed, and thus, heat exchange between the air and the refrigerant in the main core portion can be continued for a long time, and lowering of heat exchange efficiency of the heat exchanger can be suppressed further effectively.

Moreover, according to the heat pump system of the present invention, when the heat exchanger is used as an evaporator, since gas-liquid separation of the refrigerant by the receiver tank and supercooling of the refrigerant in the subcool core portion are not necessary, an increase in useless pressure loss of the refrigerant caused by passing of the refrigerant through the subcool core portion and hence, useless fluidity loss of the refrigerant can be prevented, and lowering of the heat exchange efficiency of the heat exchanger can be suppressed more effectively.

Moreover, according to the present invention, when the heat exchanger is used as an evaporator, the refrigerant having passed through the main core portion is made to bypass the receiver tank and the subcool core portion by the refrigerant channel and to flow, while when the heat exchanger is used as a condenser, since the refrigerant flow from the communication portion to the refrigerant channel side can be prevented by the valve, switching of the heat exchanger between the evaporator and the condenser in the heat pump system can be realized with a simple configuration.

Moreover, according to the present invention, by using the heat exchanger by switching it to a condenser or an evaporator without changing the flow direction of the refrigerant in the main core portion, an inlet port for heating and an inlet port for cooling can be shared by the same side of the main core portion. As a result, as compared with a case in which the heat exchanger is used by switching it to a condenser or an evaporator by changing the refrigerant flow direction in the main core portion, a circuit constitution of a refrigerant circuit can be simplified, and switching of the exterior heat exchanger to an evaporator or a condenser in the heat pump system can be performed by a simpler configuration.

Moreover, according to the present invention, specifically, the heat exchanger is suitable to be used as an exterior heat exchanger provided outside the HVAC unit for vehicle air conditioning.

DESCRIPTION OF EMBODIMENTS

A heat exchanger according to the present invention and a heat pump system using the same will be described below by referring to the attached drawings.

Figure 1:
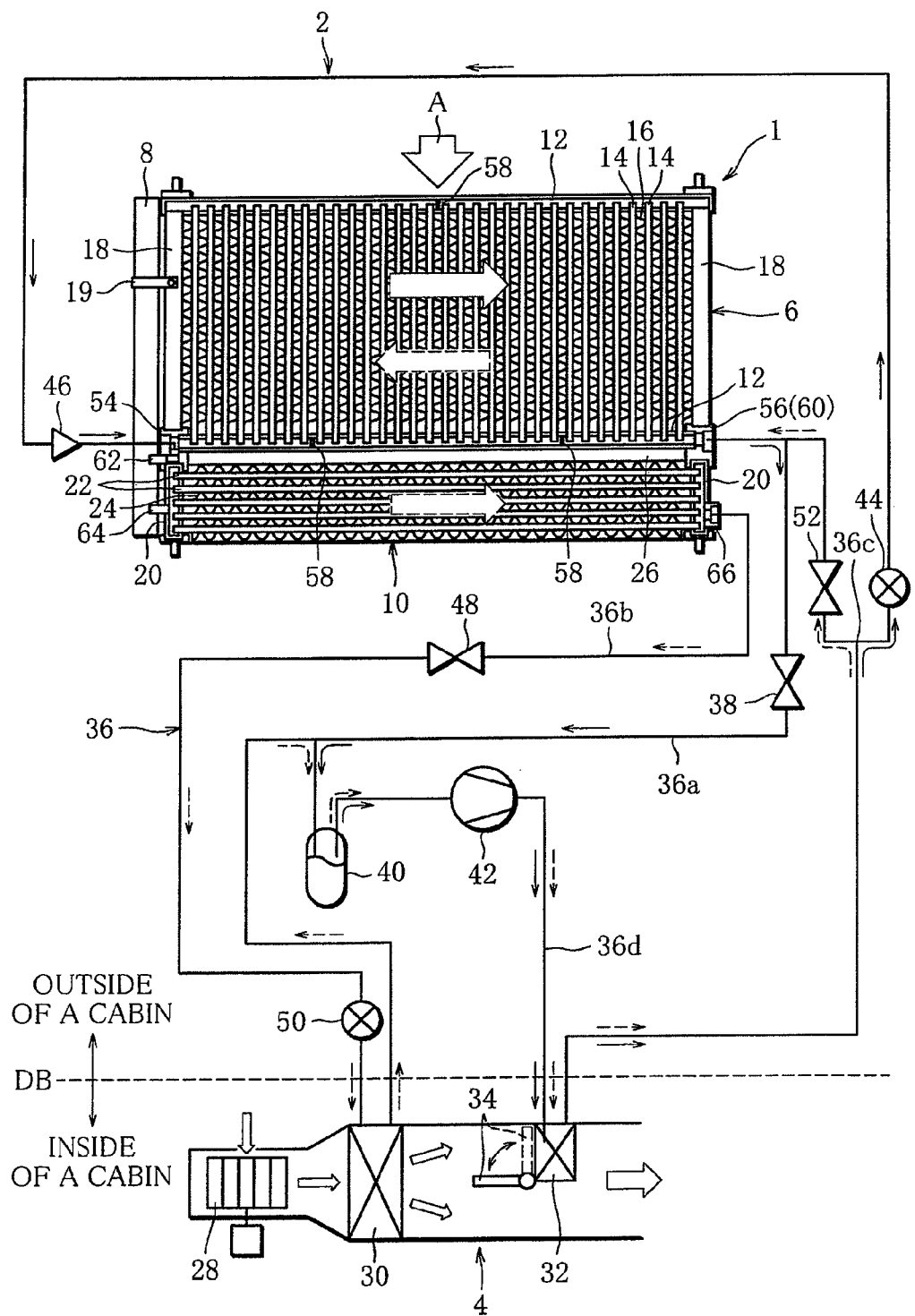
FIG. 1 is a diagram illustrating a front view of an exterior heat exchanger according to a first embodiment of the present invention, an outline configuration of a vehicle air-conditioning heat pump system in which the exterior heat exchanger is incorporated, and an outline configuration of an HVAC unit to which a heat pump system is connected.

FIG. 1 illustrates a front view of an exterior heat exchanger 1 according to the first embodiment, an outline configuration of a vehicle air-conditioning heat pump system 2 in which the exterior heat exchanger 1 is incorporated, and an outline configuration of an HVAC unit 4 to which a heat pump system 2 is connected.

The exterior heat exchanger 1 includes a main core portion 6 performing heat exchange between air and a refrigerant, a receiver tank 8 into which the refrigerant having passed through the main core portion 6 flows, and a subcool core portion 10 for supercooling and liquefying a gas-liquid mixed refrigerant having passed through the receiver tank 8 by heat exchange with the air.

The main core portion 6 is composed of a plurality of tubes 14 arranged along a vertical direction between upper and lower header tanks 12 and 12 arranged along the vertical direction, respectively, in a state in parallel with each other and communicating with both the upper and lower header tanks 12 and 12; and fins 16 arranged between the adjacent tubes 14. The fins 16 located at left and right end portions of the main core portion 6 are joined to a cover member 18 so as to ensure rigidity of the main core portion 6, and the cover member 18 on a left side is connected to the receiver tank 8 by a connecting member 19.

On the other hand, a subcool core portion 10 of this embodiment is composed of a plurality of tubes 22 arranged along a crosswise direction between left and right header tanks 20 and 20 arranged along the crosswise direction, respectively, in a state in parallel with each other and communicating with both the left and right header tanks 20 and 20; and fins 24 arranged between the adjacent tubes 22. By joining the fin 24 located on an upper end portion of the subcool core portion 10 to a cover member 26, rigidity of the subcool core portion 10 is ensured, and by joining the cover member 26 to the header tank 12 on a lower side, the subcool core portion 10 is connected to the main core portion 6.

The HVAC unit 4 is mounted on a front side in a cabin of a vehicle and is fixed to a cabin inner side of a dash panel DB dividing an engine room of the vehicle from an inside of the cabin. In the HVAC unit 4, a blower fan 28, an indoor evaporator 30, and an indoor condenser 32 are provided in the order from a direction of an air flow. On a primary side of the air flow in the indoor condenser 32, a damper 34 for opening/closing an air inlet of the indoor condenser 32 is provided, and by closing the damper 34 as indicated by a broken line in FIG. 1, the air can be made to flow while bypassing the indoor condenser 32. By having the air taken in by the blower fan 28 selectively flow to the indoor evaporator 30 or the indoor condenser 32 described above, the air in the cabin is controlled to a desired set temperature.

The heat pump system 2 is configured to be usable by switching the exterior heat exchanger 1 to a condenser or an evaporator by changing a flow direction of the refrigerant in the main core portion 6, and the exterior heat exchanger 1 is used as an evaporator during a heating operation of the heat pump system 2 and is used as a condenser during a cooling operation.

The heat pump system 2 is provided with a refrigerant circuit 36 through which a refrigerant circulates, and in a heating-operation channel (a refrigerant channel, bypass means) 36a in the refrigerant circuit 36, the exterior heat exchanger 1, a first opening/closing valve 38, an accumulator 40, a compressor 42, the indoor condenser 32, a first expansion valve 44, a check valve (valve, bypass means) 46 are interposed in the order of the refrigerant flow direction indicated by a solid line in FIG. 1.

On the other hand, in a cooling-operation channel 36b in the refrigerant circuit 36, the exterior heat exchanger 1, a second opening/closing valve 48, a second expansion valve 50, the indoor evaporator 30, the accumulator 40, the compressor 42, the indoor condenser 32, and a third opening/closing valve 52 are interposed in the order of the refrigerant flow direction indicated by a broken line in FIG. 1.

The cooling-operation channel 36b is formed by having a common channel 36d shared by the heating-operation channel 36a from the accumulator 40 to a branch path 36c between the third opening/closing valve 52 and the first expansion valve 44 through the compressor 42 and the indoor condenser 32.

Driving portions of the damper 34 and the first to third opening/closing valves 38, 48, and 52 are electrically connected to an ECU (electric control unit), not shown, for comprehensively controlling the vehicle. During cooling when the cooling-operation channel 36b is used, the ECU is controlled such that the air fed by the blower fan 28 flows while bypassing the indoor condenser 32 by closing the damper 34 and by performing opening/closing control of the first to third opening/closing valves 38, 48, and 52 as appropriate, the refrigerant flow direction (indicated by a broken-line arrow in FIG. 1) during cooling in the exterior heat exchanger 1 is made opposite to the refrigerant flow direction (indicated by a solid-line arrow in FIG. 1) during heating when the heating-operation channel 36a is used.

Here, the heat pump system 2 of this embodiment employs a configuration in which, in the heating operation when the exterior heat exchanger 1 is used as an evaporator, the refrigerant having passed through the main core portion 6 is made to flow while bypassing the receiver tank 8 and the subcool core portion 10 (bypass means).

In detail, a heating inlet port 54 to the exterior heat exchanger 1 of the heating-operation channel 36a is provided on a left end portion of the lower header tank 12, and a heating outlet port 56 to the exterior heat exchanger 1 of the heating-operation channel 36a is provided on a right end portion of the lower header tank 12.

The refrigerant having flowed into the main core portion 6 from the heating inlet port 54 during heating repeats downflow or upflow vertical flow using a plurality of partitions 58 partitioning the inside of each of the header tanks 12 as boundaries, flows from the left side to the right side as a whole as indicated by a solid-line arrow in FIG. 1 while performing heat exchange with an air A by ventilation to the main core portion 6 and is fed out to the heating-operation channel 36a from the heating outlet port 56. That is, the refrigerant during heating operation flows only through the main core portion 6 in the exterior heat exchanger 1.

On the other hand, a cooling inlet port 60 of the cooling-operation channel 36b to the exterior heat exchanger 1 is shared by the heating outlet port 56, and an inlet communication pipe (communication portion) 62 having one end communicating with the heating inlet port 54 is connected to a lower side portion of the receiver tank 8, and the other end is made to communicate with the inside of the receiver tank 8.

As described above, the inlet communication pipe 62 has the main core portion 6 and the receiver tank 8 communicate with each other when the exterior heat exchanger 1 is used as a condenser. On the other hand, when the exterior heat exchanger 1 is used as an evaporator, the inlet communication pipe 62 is made to communicate with the heating inlet port 54 to which the heating-operation channel 36a for having the refrigerant having passed through the main core portion 6 bypass the receiver tank 8 and the subcool core portion 10 is connected, and the inlet communication pipe 62 has functions of conflicting communication paths.

However, by interposing the check valve 46 preventing a refrigerant flow to a side of the heating-operation channel 36a from the inlet communication pipe 62 on the inlet side of the main core portion 6 of the heating-operation channel 36a, inflow of the refrigerant to the heating-operation channel 36a during cooling is prevented, while the inflow of the refrigerant to the inlet communication pipe 62 is allowed.

On the other hand, since the second opening/closing valve 48 is interposed in the cooling-operation channel 36b, by closing the second opening/closing valve 48 during heating, though the refrigerant flows into the receiver tank 8, the subcool core portion 10, and the second opening/closing valve 48 of the cooling-operation channel 36b, the inflow of the refrigerant to a secondary side of the second opening/closing valve 48 of the cooling-operation channel 36b is prevented. As a result, the flow of the refrigerant stagnates in the receiver tank 8 and the subcool core portion 10, and the refrigerant retains in the receiver tank 8 and the subcool core portion 10. As described above, the receiver tank 8 and the subcool core portion 10 can be substantially bypassed during heating by presence of the check valve 46 and closing of the second opening/closing valve 48, and the refrigerant flow in the main core portion 6 during heating can be made a flow opposite to the flow during cooling.

Moreover, one end of an outlet communication pipe 64 is connected to a side portion of the receiver tank 8 on a lower side of the inlet communication pipe 62 and is made to communicate with the inside of the receiver tank 8, and the other end of the outlet communication pipe 64 is made to communicate with the inside of the header tank 20 on the left side of the subcool core portion 10. Moreover, on a lower side portion of the header tank 20 on the right side of the subcool core portion 10, a cooling outlet port 66 to the exterior heat exchanger 1 of the cooling-operation channel 36b is provided.

The refrigerant having flowed into the main core portion 6 from the cooling inlet port 60 during cooling repeats downflow or upflow as described above, flows from the right side to the left side as a whole as indicated by a broken-line arrow in FIG. 1 while performing heat exchange with the air A by ventilation to the main core portion 6 and flows into the receiver tank 8 through the inlet communication pipe 62 so as to be made the gas-liquid mixed refrigerant and then, the liquid refrigerant is made to flow into the subcool core portion 10 with priority through the outlet communication pipe 64.

The refrigerant having flowed into the subcool core portion 10 flows in a crosswise flow from the left side to the right side as a whole as indicated by the broken-line arrow in FIG. 1 while performing heat exchange with the air A by the ventilation to the subcool core portion 10 so as to be completely supercooled and liquefied and then, the refrigerant is sent out to the cooling-operation channel 36b from the cooling outlet port 66. That is, the refrigerant during the cooling operation flows through both the main core portion 6 and the subcool core portion 10 in the exterior heat exchanger 1.

As described above, in this embodiment, by constituting the refrigerant flowing through the subcool core portion 10 in the crosswise flow direction, the refrigerant is less influenced by the gravitational force to the liquid refrigerant than the case of the vertical flow direction, and thus, a drift of the refrigerant in the tube 10 can be effectively suppressed. Therefore, heat exchange between the air A and the refrigerant in the subcool core portion 10 can be continued for a long time, and lowering of the heat exchange efficiency of the exterior heat exchanger 1 can be suppressed.

Moreover, by constituting the refrigerant flowing through the main core portion 6 in the vertical flow direction, occurrence of a frosting phenomenon on the surfaces of the tubes 14 can be suppressed and thus, heat exchange between the air A and the refrigerant in the main core portion 6 can be continued for a long time, and lowering of the heat exchange efficiency of the exterior heat exchanger 1 can be suppressed more effectively.

Moreover, if the exterior heat exchanger 1 is used as an evaporator, since gas-liquid separation of the refrigerant by the receiver tank 8 and supercooling of the refrigerant in the subcool core portion 10 are not necessary, an increase in useless pressure loss of the refrigerant caused by passing of the refrigerant through the subcool core portion 10 and hence, useless fluidity loss of the refrigerant can be prevented, and lowering of the heat exchange efficiency of the exterior heat exchanger 1 can be suppressed more effectively.

Moreover, if the exterior heat exchanger is used as an evaporator, the refrigerant having passed through the main core portion 6 by the heating-operation channel 36a can be made to flow while bypassing the receiver tank 8 and the subcool core portion 10, while if the exterior heat exchanger 1 is used as a condenser, the refrigerant flow to the inlet communication pipe 62 side can be prevented by the check valve 46, and thus, switching of the exterior heat exchanger 1 between the evaporator and the condenser in the heat pump system 2 can be reliably performed with a simple configuration.

Figure 2:
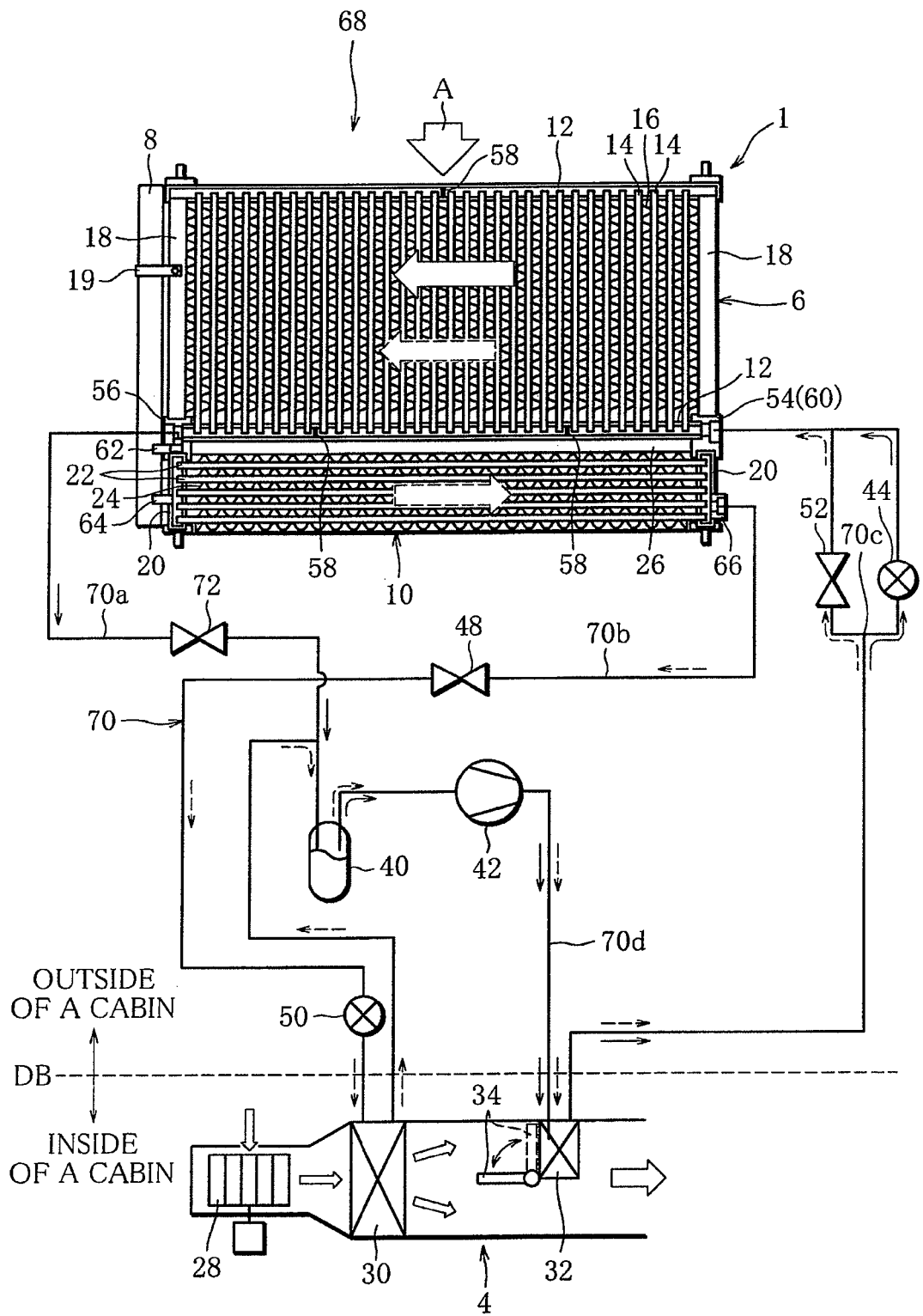
FIG. 2 is a diagram illustrating a front view of an exterior heat exchanger according to a second embodiment of the present invention, an outline configuration of a vehicle air-conditioning heat pump system in which the exterior heat exchanger is incorporated, and an outline configuration of an HVAC unit to which a heat pump system is connected.

FIG. 2 illustrates a front view of the exterior heat exchanger 1 according to a second embodiment, an outline configuration of a vehicle air-conditioning heat pump system 68 in which the exterior heat exchanger 1 is incorporated, and an outline configuration of the HVAC unit 4 to which a heat pump system 68 is connected. The same reference numerals are given to the configuration in common with the first embodiment, and explanation will be omitted.

The heat pump system 68 of this embodiment is configured usable by switching the exterior heat exchanger 1 to a, condenser or an evaporator without changing the flow direction of the refrigerant in the main core portion 6, and the exterior heat exchanger 1 is used as an evaporator during heating operation of the heat pump system 68 and is used as a condenser during cooling operation.

The heat pump system 68 is provided with a refrigerant circuit 70 different from the refrigerant circuit 36, and in a heating-operation channel (refrigerant channel, bypass means) 70a in the refrigerant circuit 70, the exterior heat exchanger 1, a fourth opening/closing valve (bypass means, valve) 72, the accumulator 40, the compressor 42, the indoor condenser 32, and the first expansion valve 44 are interposed in the order of the refrigerant flow direction indicated by a solid line in FIG. 1.

On the other hand, in a cooling-operation channel 70b in the refrigerant circuit 70, the exterior heat exchanger 1, the second opening/closing valve 48, the second expansion valve 50, the indoor evaporator 30, the accumulator 40, the compressor 42, the indoor condenser 32, and the third opening/closing valve 52 are interposed in the order of the refrigerant flow direction indicated by a broken line in FIG. 1.

The cooling-operation channel 70b is formed by having a common channel 70d shared by the heating-operation channel 70a from the accumulator 40 to a branch path 70c between the third opening/closing valve 52 and the first expansion valve 44 through the compressor 42 and the indoor condenser 32.

Here, the heat pump system 68 of this embodiment employs a configuration in which the refrigerant flow direction in the main core portion 6 is the same in the heating operation and the cooling operation, and in the heating operation when the exterior heat exchanger 1 is used as an evaporator, the refrigerant having passed through the main core portion 6 is made to flow while bypassing the receiver tank 8 and the subcool core portion 10 (bypass means).

In detail, the heating inlet port 54 to the exterior heat exchanger 1 of the heating-operation channel 70a is provided on the right end portion of the lower header tank 12, and a heating outlet port 56 of the heating-operation channel 70a to the exterior heat exchanger 1 is provided on the left end portion of the lower header tank 12.

The refrigerant having flowed into the main core portion 6 from the heating inlet port 54 during heating repeats downflow or upflow vertical flow using the plurality of partitions 58 partitioning the inside of each of the header tanks 12 as boundaries, flows from the right side to the left side as a whole as indicated by a solid-line arrow in FIG. 2 while performing heat exchange with the air A by ventilation to the main core portion 6 and is fed out to the heating-operation channel 70a from the heating outlet port 56. That is, the refrigerant during heating operation flows only through the main core portion 6 in the exterior heat exchanger 1.

On the other hand, the cooling inlet port 60 of the cooling-operation channel 70b to the exterior heat exchanger 1 is shared by the heating inlet port 54, and the inlet communication pipe 62 having one end communicating with the heating outlet port 56 is connected to the lower side portion of the receiver tank 8, and the other end is made to communicate with the inside of the receiver tank 8.

As described above, the inlet communication pipe 62 has the main core portion 6 and the receiver tank 8 communicate with each other when the exterior heat exchanger 1 is used as a condenser. On the other hand, when the exterior heat exchanger 1 is used as an evaporator, the inlet communication pipe 62 is made to communicate with the heating outlet port 56 to which the heating-operation channel 70a for having the refrigerant having passed through the main core portion 6 bypass the receiver tank 8 and the subcool core portion 10 is connected.

However, by interposing the fourth opening/closing valve 72 preventing the refrigerant flow to a side of the heating-operation channel 70a side from the inlet communication pipe 62 on the outlet side of the main core portion 6 of the heating-operation channel 70a, the inflow of the refrigerant to the inlet communication pipe 62 is allowed while inflow of the refrigerant to the secondary side of the fourth opening/closing valve 72 of the heating-operation channel 70a is prevented during cooling by closing the fourth opening/closing valve 72.

On the other hand, by closing the second opening/closing valve 48 during heating, though the refrigerant flows into the receiver tank 8, the subcool core portion 10, and the second opening/closing valve 48 of the cooling-operation channel 70b, the inflow of the refrigerant to the secondary side of the second opening/closing valve 48 of the cooling-operation channel 70b is prevented. As a result, the flow of the refrigerant stagnates in the receiver tank 8 and the subcool core portion 10, and the refrigerant retains in the receiver tank 8 and the subcool core portion 10. As described above, the receiver tank 8 and the subcool core portion 10 can be bypassed during heating by closing of the fourth opening/closing valve 72 or closing of the second opening/closing valve 48 while the refrigerant flow in the main core portion 6 is kept in the same flow direction both for the heating and cooling.

As described above, in this embodiment, similarly to the first embodiment, the refrigerant flowing through the subcool core portion 10 is constituted as the crosswise flow direction, and the refrigerant flowing through the main core portion 6 as the vertical flow direction so as to prevent the increase in the useless pressure loss of the refrigerant caused by passing of the refrigerant through the subcool core portion 10 and hence, the useless fluidity loss of the refrigerant, and lowering of heat exchange efficiency of the exterior heat exchanger 1 can be suppressed.

Moreover, in switching during cooling/heating, the refrigerant flow direction in the main core portion 6 is not changed but the heating inlet port 54 provided on the right end portion of the header tank 12 on the lower side is shared by the cooling inlet port 60 so that, in the first embodiment, routing of refrigerant piping from the common channel 36d provided on the left end portion of the header tank 12 on the lower side to the heating inlet port 54 provided on the right end portion of the header tank 12 on the lower side becomes unnecessary. Therefore, since the circuit configuration of the refrigerant circuit 70 can be simplified, switching between the evaporator and the condenser of the exterior heat exchanger 1 in the heat pump system 68 can be performed with simpler configuration.

The embodiments of the present invention have been described above, but the present invention is not limited to each of the above embodiments but is capable of various changes within a range not departing from the gist of the present invention.

For example, the number of partitions 58 and the interval between each of the partitions 58 illustrated in the first embodiment are not limited to them, but the number of the partitions 58 may be increased, and the interval between each of the partitions 58 may be gradually narrowed when seen from the refrigerant flow direction in the main core portion 6 during cooling. In this case, a volume of the refrigerant channel of the main core portion 6 during heating can be increased in steps by path allocation, while the volume of the refrigerant channel of the main core portion 6 during cooling can be decreased in steps by path allocation. Therefore, since the density of the refrigerant is decreased in steps during heating, the refrigerant can evaporate easily, while since the density of the refrigerant is increased in steps during cooling, the refrigerant can condense easily and thus, heat exchange efficiency of the exterior heat exchanger 1 can be further improved.

On the other hand, the interval between each of the partitions 58 illustrated in the second embodiment is preferably equal as illustrated in FIG. 2 since the refrigerant flow direction of the main core portion 6 is the same during cooling/heating.

Moreover, in each of the above embodiments, the case in which the present invention is suitably used for the exterior heat exchanger 1 provided outside the HVAC unit 4 for vehicle air-conditioning is described, but the present invention can be also applied to heat exchangers and heat pump systems for other applications.

Moreover, in each of the above embodiments, the main core portion 6 and the subcool core portion 10 are connected vertically without overlapping each other in the ventilation direction, but this configuration is not limiting, and the main core portion 6 and the subcool core portion 10 may be connected in the crosswise direction, or the main core portion 6 and the subcool core portion 10 may be connected so as to overlap each other in the ventilation direction. If the main core portion 6 and the subcool core portion 10 are overlapped in the ventilation direction, by arranging the subcool core portion 10 on the front when seen in the ventilation direction, lowering of heat exchange efficiency of the exterior heat exchanger 1 can be effectively suppressed, which is preferable.

Moreover, it is needless to say that the configurations of the heat pump system 2 and the HVAC unit 4 described in each of the embodiments are capable of various changes.

REFERENCE SIGNS LIST 1 exterior heat exchanger (heat exchanger)
2 heat pump system for vehicle air-conditioning (heat pump system)
6 main core portion
8 receiver tank
10 subcool core portion
12 header tank
14 tube 16 fin
20 header tank
22 tube
24 fin
36a heating-operation channel (refrigerant channel, bypass means)
46 check valve (valve, bypass means)
62 inlet communication pipe (communication portion)
68 heat pump system for vehicle air-conditioning (heat pump system)
70a heating-operation channel (refrigerant channel, bypass means)
72 fourth opening/closing valve (bypass means, valve)

The invention claimed is:

1. A heat pump system using a heat exchanger, the heat exchanger comprising:
   a main core portion for conducting heat exchange between air and a refrigerant;
   a receiver tank into which the refrigerant having passed through the main core portion flows; and
   a subcool core portion for supercooling and liquefying a gas-liquid mixed refrigerant having passed through the receiver tank by heat exchange with the air, wherein the subcool core portion is composed of a plurality of tubes arranged along a crosswise direction between left and right header tanks arranged along the crosswise direction, respectively, in a state in parallel with each other and communicating with both the left and right header tanks; and fins arranged between the adjacent tubes,
   wherein the heat exchanger is capable of switching to a condenser or an evaporator by changing a flow direction of a refrigerant in the main core portion,
   wherein the heat exchanger is capable of being used as an exterior heat exchanger provided outside an HVAC unit for vehicle air-conditioning, and
   wherein the heat pump system further comprises a bypass apparatus for having the refrigerant having passed through the main core portion flow while bypassing the receiver tank and the subcool core portion when the heat exchanger is used as the evaporator.

2. The heat pump system according to claim 1, wherein the main core portion is composed of a plurality of tubes arranged along a vertical direction between upper and lower header tanks arranged along the vertical direction, respectively, in a state in parallel with each other and communicating with both the upper and lower header tanks; and fins arranged between the adjacent tubes.

3. The heat pump system according to claim 1,
   wherein the heat exchanger is provided with a communication portion for having the main core portion and the receiver tank communicate with each other when the heat exchanger is used as the condenser; and
   wherein the bypass apparatus comprises:
      a refrigerant channel made to communicate with the communication portion after the refrigerant having passed through the main core portion when the heat exchanger is used as the evaporator is made to flow while bypassing the receiver tank and the subcool core portion; and
      a valve provided on an inlet side of the main core portion of the refrigerant channel and preventing a refrigerant flow to a side of the refrigerant channel from the communication portion when the heat exchanger is used as the condenser.

4. A heat pump system using a heat exchanger, the heat exchanger comprising:
   a main core portion for conducting heat exchange between air and a refrigerant;
   a receiver tank into which the refrigerant having passed through the main core portion flows; and
   a subcool core portion for supercooling and liquefying a gas-liquid mixed refrigerant having passed through the receiver tank by heat exchange with the air, wherein the subcool core portion is composed of a plurality of tubes arranged along a crosswise direction between left and right header tanks arranged along the crosswise direction, respectively, in a state in parallel with each other and communicating with both the left and right header tanks; and fins arranged between the adjacent tubes,
   wherein the heat exchanger is capable of switching to a condenser or an evaporator without changing the refrigerant flow direction in the main core portion,
   wherein the heat exchanger is capable of being used as an exterior heat exchanger provided outside an HVAC unit for vehicle air conditioning, and
   wherein the heat pump system further comprises a bypass apparatus for having the refrigerant having passed through the main core portion flow while bypassing the receiver tank and the subcool core portion when the heat exchanger is used as the evaporator.

5. The heat pump system according to claim 4, wherein the heat exchanger is provided with a communication portion for having the main core portion and the receiver tank communicate with each other when the heat exchanger is used as the condenser; and
   the bypass apparatus comprises:
      a refrigerant channel made to communicate with the communication portion after the refrigerant having passed through the main core portion is made to flow while bypassing the receiver tank and the subcool core portion when the heat exchanger is used as the evaporator; and
      a valve provided on an outlet side of the main core portion of the refrigerant channel and preventing a refrigerant flow to a side of the refrigerant channel from the communication portion when the heat exchanger is used as the condenser.

6. The heat pump system according to claim 4, wherein the main core portion is composed of a plurality of tubes arranged along a vertical direction between upper and lower header tanks arranged along the vertical direction, respectively, in a state in parallel with each other and communicating with both the upper and lower header tanks; and fins arranged between the adjacent tubes.

* * * * *